(12) United States Patent
Kim et al.

(10) Patent No.: US 12,476,331 B2
(45) Date of Patent: Nov. 18, 2025

(54) BATTERY MODULE AND BATTERY PACK INCLUDING THE SAME

(71) Applicant: LG Energy Solution, Ltd., Seoul (KR)

(72) Inventors: Min Seop Kim, Daejeon (KR); Junyeob Seong, Daejeon (KR); Jonghwa Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 599 days.

(21) Appl. No.: 17/801,902

(22) PCT Filed: Apr. 8, 2021

(86) PCT No.: PCT/KR2021/004394
§ 371 (c)(1),
(2) Date: Aug. 24, 2022

(87) PCT Pub. No.: WO2021/215712
PCT Pub. Date: Oct. 28, 2021

(65) Prior Publication Data
US 2023/0096324 A1    Mar. 30, 2023

(30) Foreign Application Priority Data
Apr. 22, 2020  (KR) .................. 10-2020-0048651

(51) Int. Cl.
*H01M 50/514* (2021.01)
*H01M 50/211* (2021.01)
(Continued)

(52) U.S. Cl.
CPC ....... *H01M 50/514* (2021.01); *H01M 50/211* (2021.01); *H01M 50/271* (2021.01); *H01M 50/503* (2021.01); *H01M 50/505* (2021.01)

(58) Field of Classification Search
CPC ............. H01M 50/514; H01M 50/211; H01M 50/505; H01M 50/503; H01M 50/271
See application file for complete search history.

(56) References Cited

U.S. PATENT DOCUMENTS

| 2013/0104390 A1 | 5/2013 | Zhao et al. |
| 2015/0132630 A1 | 5/2015 | Kim et al. |

(Continued)

FOREIGN PATENT DOCUMENTS

| EP | 3828983 A1 | 6/2021 |
| KR | 101426612 B1 | 8/2014 |

(Continued)

OTHER PUBLICATIONS

International Search Report for PCT/KR2021/004394, dated Aug. 4, 2021. 3 pgs.

*Primary Examiner* — Jane J Rhee
(74) *Attorney, Agent, or Firm* — Lerner David LLP

(57) ABSTRACT

A battery module includes a battery cell stack, a module frame, and a bus bar frame. The battery cell stack is configured to include a plurality of battery cells including electrode leads that are stacked in in the battery cells. The module frame is configured to accommodate the battery cell stack. The bus bar frame is positioned in a protrusion direction of the electrode leads protruding from the battery cells. A protrusion is formed in either the bus bar frame or the module frame. An insertion hole into which the protrusion is inserted is formed in the other of the bus bar frame and the module frame than the one of the bus bar frame and the module frame in which the protrusion is formed.

8 Claims, 9 Drawing Sheets

(51) Int. Cl.
*H01M 50/271* (2021.01)
*H01M 50/503* (2021.01)
*H01M 50/505* (2021.01)

(56) References Cited

U.S. PATENT DOCUMENTS

| | | |
|---|---|---|
| 2016/0254522 A1 | 9/2016 | Johler et al. |
| 2019/0131596 A1* | 5/2019 | Yang .................. H01M 50/224 |
| 2020/0067040 A1 | 2/2020 | Kim et al. |
| 2020/0168887 A1 | 5/2020 | Yoo et al. |

FOREIGN PATENT DOCUMENTS

| | | |
|---|---|---|
| KR | 101928072 B1 | 12/2018 |
| KR | 101938510 B1 | 1/2019 |
| KR | 101987773 B1 | 6/2019 |
| KR | 20190096674 A | 8/2019 |
| KR | 20200008624 A | 1/2020 |
| KR | 20200021609 A | 3/2020 |
| KR | 20200040619 A | 4/2020 |

* cited by examiner

BATTERY MODULE AND BATTERY PACK INCLUDING THE SAME

CROSS-REFERENCE TO RELATED APPLICATION(S)

This application claims priority to and the benefit of Korean Patent Application No. 10-2020-0048651, filed in the Korean Intellectual Property Office on Apr. 22, 2020, the entire contents of which are incorporated herein by reference.

TECHNICAL FIELD

The present invention relates to a battery module and a battery pack including the same, and more particularly, to a battery module having a bus bar frame and a battery pack including the same.

BACKGROUND ART

In modern society, as portable devices such as mobile phones, laptops, camcorders, and digital cameras are used in daily life, development of techniques related to mobile devices as described above is becoming active. In addition, a rechargeable battery capable of charging and discharging is a measure to solve air pollution such as from conventional gasoline vehicles using fossil fuels, and is used as a power source for electric vehicles (EVs), hybrid electric vehicles (HEVs), and plug-in hybrid electric vehicles (P-HEV), and thus a need for development of rechargeable batteries is increasing.

Currently commercially available rechargeable batteries include a nickel cadmium battery, a nickel hydrogen battery, a nickel zinc battery, and a lithium rechargeable battery, and among them, the lithium rechargeable battery has little memory effect compared to nickel-based rechargeable batteries, so it is in the spotlight as it is freely charged and discharged, has a very low self-discharge rate, and has high energy density.

Such a lithium rechargeable battery mainly uses a lithium-based oxide and a carbon material as a positive electrode active material and a negative electrode active material, respectively. The lithium rechargeable battery includes an electrode assembly in which a positive electrode plate and a negative electrode plate to which a positive electrode active material and a negative electrode active material are respectively applied with a separator therebetween, and a battery case for sealing and housing the electrode assembly together with an electrolyte.

In general, a lithium rechargeable battery may be classified into a can-type rechargeable battery in which an electrode assembly is embedded in a metal can, and a pouch-type rechargeable battery in which an electrode assembly is embedded in a pouch of an aluminum laminate sheet depending on a shape of an exterior material.

In the case of rechargeable batteries used for small devices, 2-3 battery cells are positioned, but in the case of rechargeable batteries used for mid- to large-sized devices such as vehicles, a battery module in which a plurality of battery cells are electrically connected is used. In such a battery module, a plurality of battery cells are connected in series or parallel to each other to form a battery cell stack, thereby improving capacity and output. In addition, one or more battery modules may be mounted together with various control and protection systems, such as a battery management system (BMS) and a cooling system, to constitute a battery pack.

FIG. 1 illustrates an exploded perspective view of a conventional battery module.

Referring to FIG. 1, the conventional battery module 10 may include a battery cell stack 12 formed by stacking a plurality of battery cells 11, a monoframe 20 for accommodating the battery cell stack 12, and an end plate 40 for covering opposite open sides of the monoframe 20. A bus bar frame 30 may be positioned between the battery cell stack 12 and the end plate 40.

The bus bar frame 30 may cover front and rear surfaces of the battery cell stack 12, and at the same time, may guide electrical connection between the battery cells 11. Specifically, a bus bar 31 may be mounted to the bus bar frame 30, and an electrode lead 13 of each of the battery cells 11 may extend through a slit formed in the bus bar frame 30 to then be electrically connected to the bus bar 31. Accordingly, the battery cells 11 may be connected in series or in parallel.

In this case, the bus bar frame 30 may be usually made of an injection member, but as a size of the battery module 10 increases, the bus bar frame 30 may be bent. In particular, a phenomenon in which the bus bar frame 30 is bent in a direction in which the battery cell stack 12 is positioned, that is, an x-axis direction, occurs frequently.

When the bus bar frame 30 is bent, it becomes difficult to assemble the bus bar frame 30 with components such as the monoframe 20 and the end plate 40, and a component such as the bus bar 31 or a connector (not illustrated) may not be stably mounted on the bus bar frame 30. In addition, a pressure depending on such a bending phenomenon is applied to the electrode lead 13, which may cause manufacturing defects.

The above information disclosed in this Background section is only for enhancement of understanding of the background of the invention, and therefore, it may contain information that does not form the prior art that is already known in this country to a person of ordinary skill in the art.

DISCLOSURE

Technical Problem

The present invention has been made in an effort to provide a battery module and a battery pack including the same, which prevents bending of a bus bar frame and improves assembly and manufacturing processability.

However, the problem to be solved by the exemplary embodiments of the present invention is not limited to the above-described problems, and can be variously extended within the scope of the technical spirit included in the present invention.

Technical Solution

An exemplary embodiment of the present invention provides a battery module including: a battery cell stack configured to include a plurality of battery cells including electrode leads that are stacked therein; a module frame configured to accommodate the battery cell stack; and a bus bar frame positioned in a protrusion direction of the electrode leads protruding from the battery cells, wherein a protrusion is formed in one of the bus bar frame and the module frame, and an insertion hole into which the protrusion is inserted is formed in the other.

The protrusion may be formed on the bus bar frame, and the insertion hole may be formed in the module frame.

The protrusion may include a first protrusion protruding upward from an upper edge of the bus bar frame and a second protrusion protruding downward from a lower edge of the bus bar frame.

The insertion hole may include a first insertion hole formed in an upper plate of the module frame and a second insertion hole formed in a lower plate of the module frame, the first protrusion may be inserted into the first insertion hole, and the second protrusion may be inserted into the second insertion hole.

The protrusion may be formed on the module frame, and the insertion hole may be formed in the bus bar frame.

The protrusion may include a third protrusion protruding downward from an upper plate of the module frame and a fourth protrusion protruding upward from a lower plate of the module frame.

The insertion hole may include a third insertion hole formed in an upper edge of the bus bar frame and a fourth insertion hole formed in a lower edge of the bus bar frame, the third protrusion may be inserted into the third insertion hole, and the fourth protrusion may be inserted into the fourth insertion hole.

The bus bar frame may be an injection member manufactured by injection molding.

The protrusion and the insertion hole may each be configured in a plurality.

The module frame may include a U-shaped frame that covers a lower surface and opposite surfaces of the battery cell stack and an upper cover that covers an upper surface of the battery cell stack.

Advantageous Effects

According to the embodiments of the present invention, a bending phenomenon of a bus bar frame may be prevented through an insertion structure of a protrusion and a hole, and assembly and manufacturing processability between components of a battery module may be improved.

The effects of the present invention are not limited to the effects mentioned above, and other effects not mentioned can be clearly understood by those skilled in the art from the description of the claims.

MODE FOR INVENTION

Figure 1:
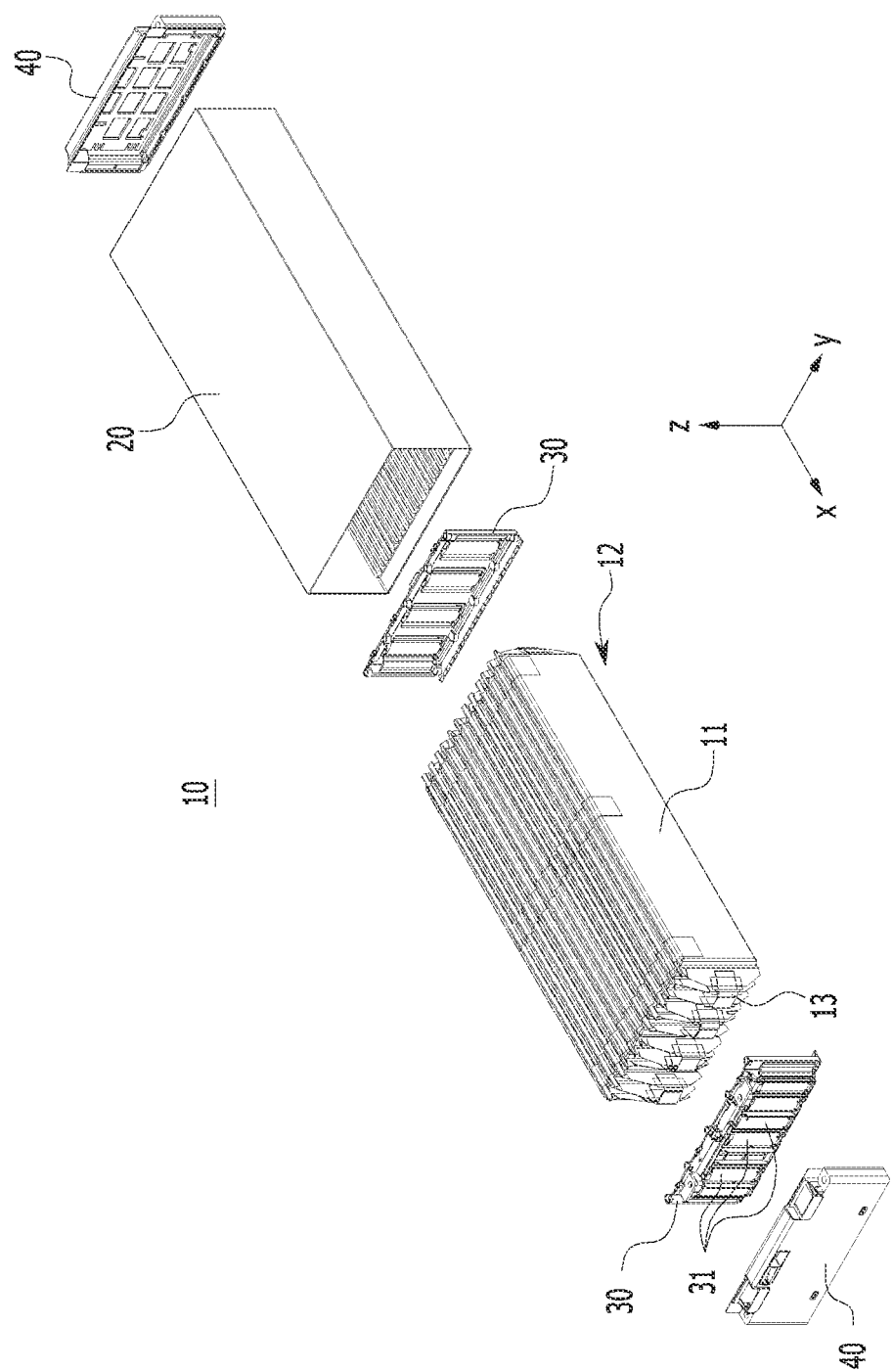
FIG. 1 illustrates an exploded perspective view of a conventional battery module.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

To clearly describe the present invention, parts that are irrelevant to the description are omitted, and like numerals refer to like or similar constituent elements throughout the specification.

Further, since sizes and thicknesses of constituent members shown in the accompanying drawings are arbitrarily given for better understanding and ease of description, the present invention is not limited to the illustrated sizes and thicknesses. In the drawings, the thicknesses of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, in the specification, the phrase "in a plan view" means when an object portion is viewed from above, and the phrase "in a cross-sectional view" means when a cross-section taken by vertically cutting an object portion is viewed from the side.

Figure 2:
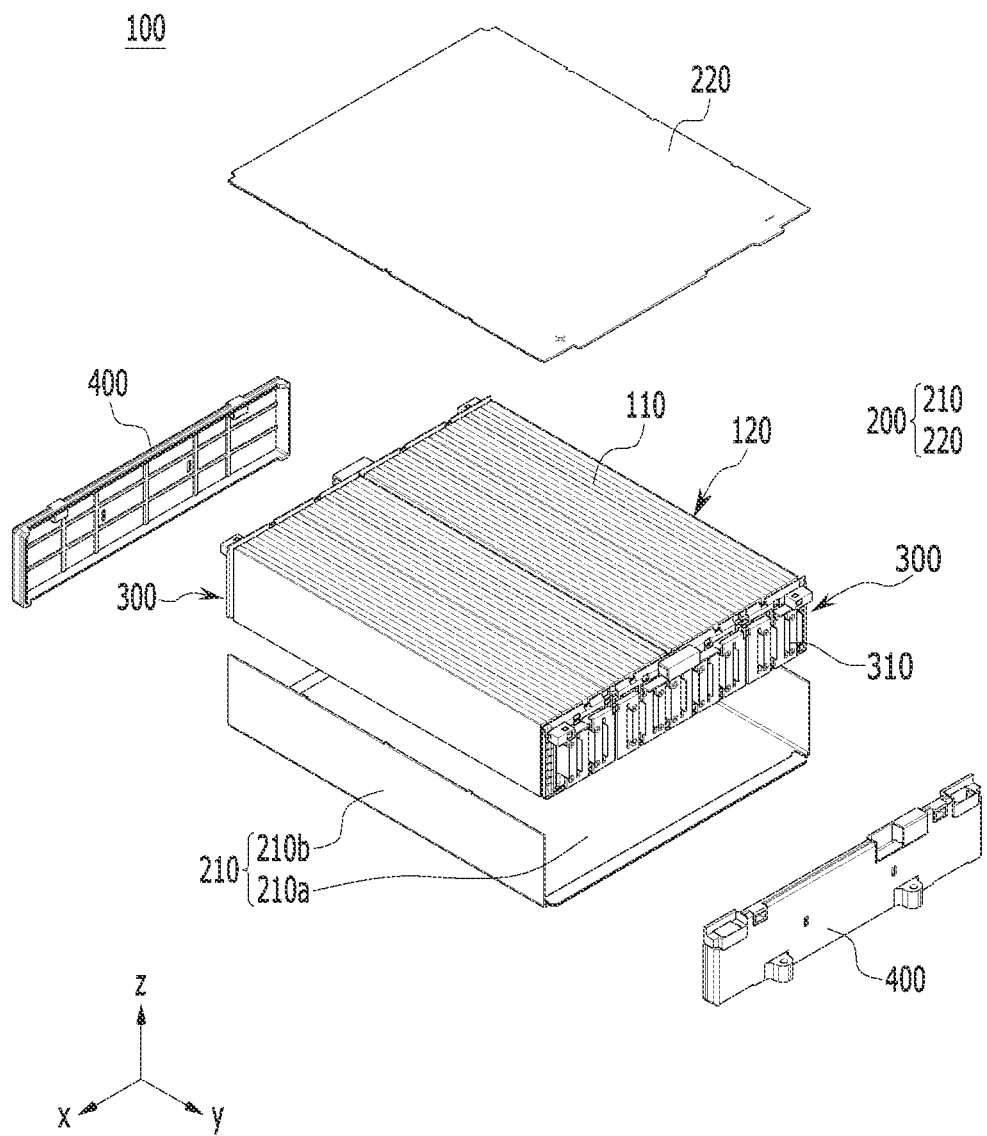
FIG. 2 illustrates an exploded perspective view of a battery module according to an exemplary embodiment of the present invention.
Figure 3:
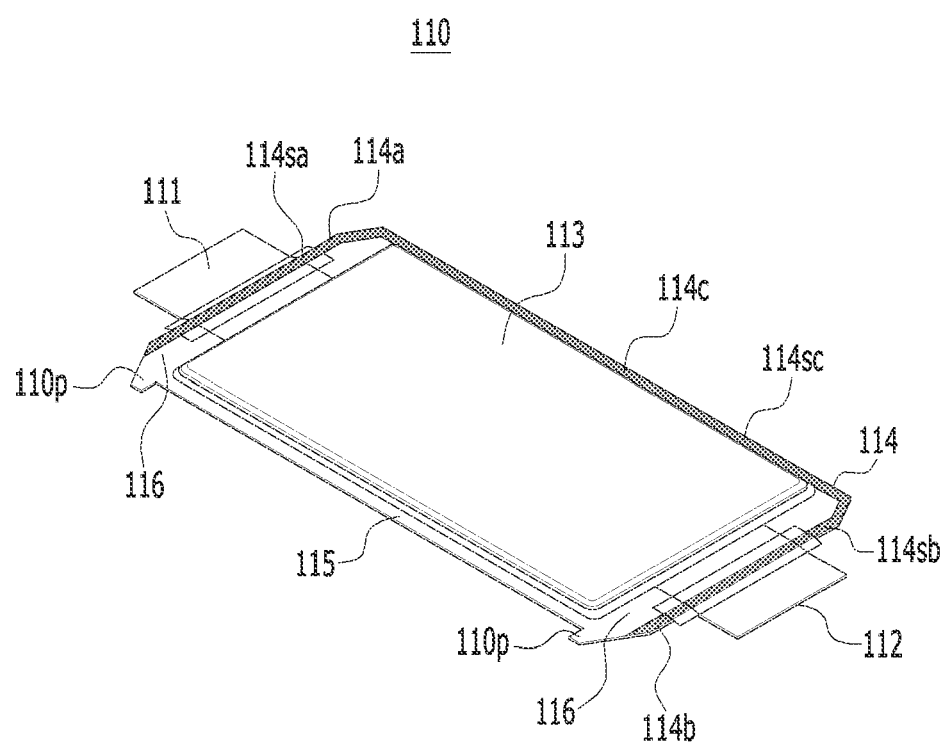
FIG. 3 illustrates a perspective view of a battery cell included in the battery module of FIG. 2.

FIG. 2 illustrates an exploded perspective view of a battery module according to an exemplary embodiment of the present invention, and FIG. 3 illustrates a perspective view of a battery cell included in the battery module of FIG. 2.

Referring to FIG. 2 and FIG. 3, a battery module 100 according to an embodiment of the present invention includes: a battery cell stack 120 in which a plurality of battery cells 110 including electrode leads 111 and 112 are stacked; a module frame 200 for accommodating the battery cell stack 120; and a bus bar frame 300 positioned in a protruding direction of the electrode leads 111 and 112 protruding from the battery cell 110. In this case, a protrusion is formed in one of the bus bar frame 300 and the module frame 200, and an insertion hole into which the protrusion is inserted is formed in the other one.

First, the battery cells 110 may each be preferably a pouch-type battery cell, and may be formed to have a rectangular sheet-like structure. For example, each of the battery cells 110 according to the present embodiment has a structure in which two electrode leads 111 and 112 face each other and protrude from a first end portion 114a and a second end portion 114b of a cell body 113, respectively. Specifically, the electrode leads 111 and 112 are connected to an electrode assembly (not illustrated), and protrude from the electrode assembly (not illustrated) to the outside of the battery cell 110.

Meanwhile, the battery cell 110 may be manufactured by attaching the opposite end portions 114a and 114b of the cell case 114 and one side portion 114c connecting them in a state in which the electrode assembly (not illustrated) is accommodated in the cell case 114. In other words, the battery cell 110 according to the present embodiment has a total of three sealing portions 114sa, 114sb, and 114sc, the sealing portions 114sa, 114sb, and 114sc are sealed by a method such as thermal fusion, and the other one side portion may be formed as a connection portion 115. The cell case 114 may be formed of a laminate sheet including a resin layer and a metal layer.

In addition, the connection portion 115 may extend along an edge of the battery cell 110, and a bat ear 110p may be formed at an end portion of the connection portion 115. In addition, while the cell case 114 is sealed with the protruding electrode leads 111 and 112 therebetween, a terrace portion 116 may be formed between the electrode leads 111 and 112 and the cell body 113. That is, the battery cell 110 may include the terrace portion 116 extending from the cell case 114 in a direction in which the electrode leads 111 and 112 protrude.

The battery cells 110 may be configured in a plurality, and may be stacked to be electrically connected to each other to constitute the battery cell stack 120. In particular, as illustrated in FIG. 2, the battery cells 110 may be stacked in a direction that is parallel to an x-axis.

The module frame 200 accommodating the battery cell stack 120 may include an upper cover 220 and a U-shaped frame 210.

The U-shaped frame 210 may include a bottom portion 210a and two side portions 210b extending upward from opposite ends of the bottom portion 210a. The bottom portion 210a may cover a lower surface (opposite direction to a z-axis) of the battery cell stack 120, and the side portion 210b may cover opposite side surfaces (direction opposite to the x-axis direction) of the battery cell stack 120.

The upper cover 220 may be formed to have a plate-shaped structure that covers a lower surface thereof that is covered by the U-shaped frame 210 and an upper surface thereof (z-axis direction) other than the opposite side surfaces. The upper cover 220 and the U-shaped frame 210 may form a structure that covers the battery cell stack 120 up, down, left, and right by being coupled by welding or the like in a state in which corresponding corner portions thereof are in contact with each other. The battery cell stack 120 may be physically protected through the upper cover 220 and the U-shaped frame 210. To this end, the upper cover 220 and the U-shaped frame 210 may include a metal material having predetermined strength.

The end plate 400 may be formed to cover the battery cell stack 120 by being positioned on open opposite sides (y-axis direction and opposite direction thereto) of the module frame 200. The end plate 400 may physically protect the battery cell stack 120 and other electrical components from external impact.

The bus bar frame 300 may be positioned in the protruding direction of the electrode leads 111 and 112 protruding from the battery cell 110, and may be positioned between the battery cell stack 120 and the end plate 400. The bus bar frame 300 may be an injection member manufactured by injection molding.

A bus bar 310 may be mounted on the bus bar frame 300. The bus bar 310 serves to electrically connect the battery cells 110 included in the battery cell stack 120. The electrode leads 111 and 112 of the battery cell 110 may extend through a slit formed in the bus bar frame 300, and then to be bent to be connected to the bus bar 310. Accordingly, the battery cells 110 may be connected in series or in parallel. A method of connecting the electrode leads 111 and 112 and the bus bar 310 is not particularly limited, and a method such as welding may be applied.

Although not specifically illustrated, an insulating cover for electrical insulation may be positioned between the bus bar frame 300 and the end plate 400.

Meanwhile, the battery module 100 according to the present embodiment may be a large-area battery module in which a number of stacked battery cells increases significantly compared to the prior art. The large-area battery module may include a case in which about 32 to 48 battery cells are stacked in one battery module compared to a case in which about 12 to 24 battery cells are stacked in one battery module.

Hereinafter, a protrusion and an insertion hole according to an embodiment of the present invention will be described in detail with reference to FIG. 4 to FIG. 7.

Figure 4:
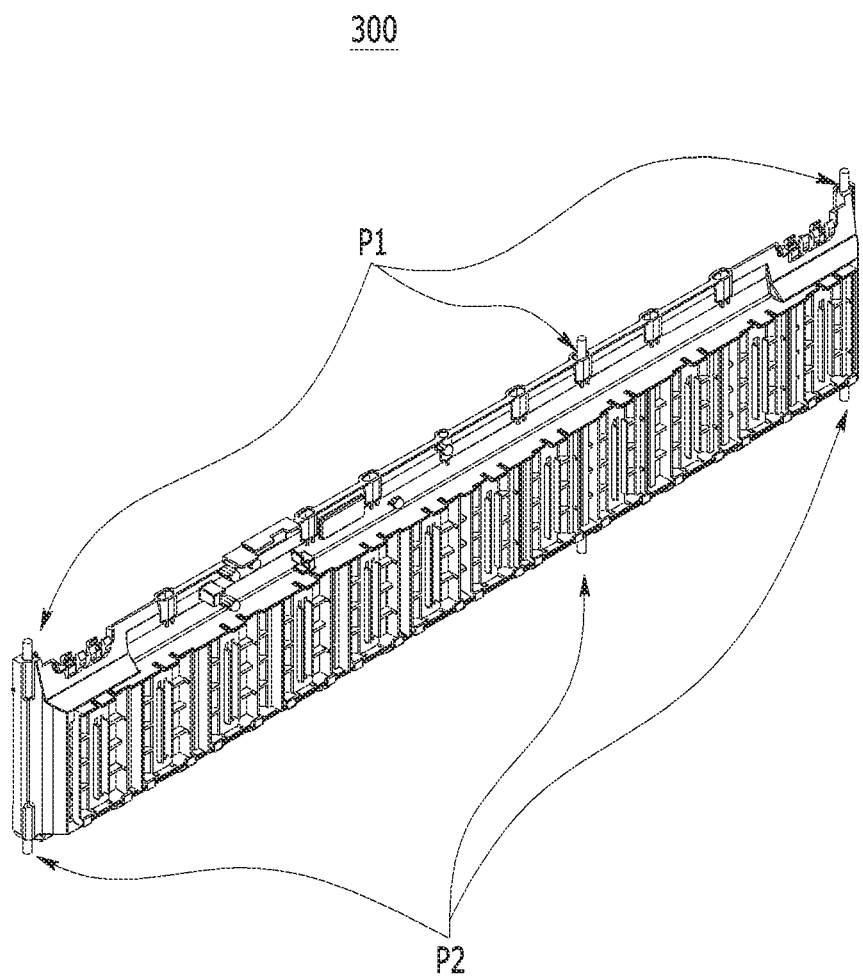
FIG. 4 illustrates a perspective view of a bus bar frame included in the battery module of FIG. 2.
Figure 5:
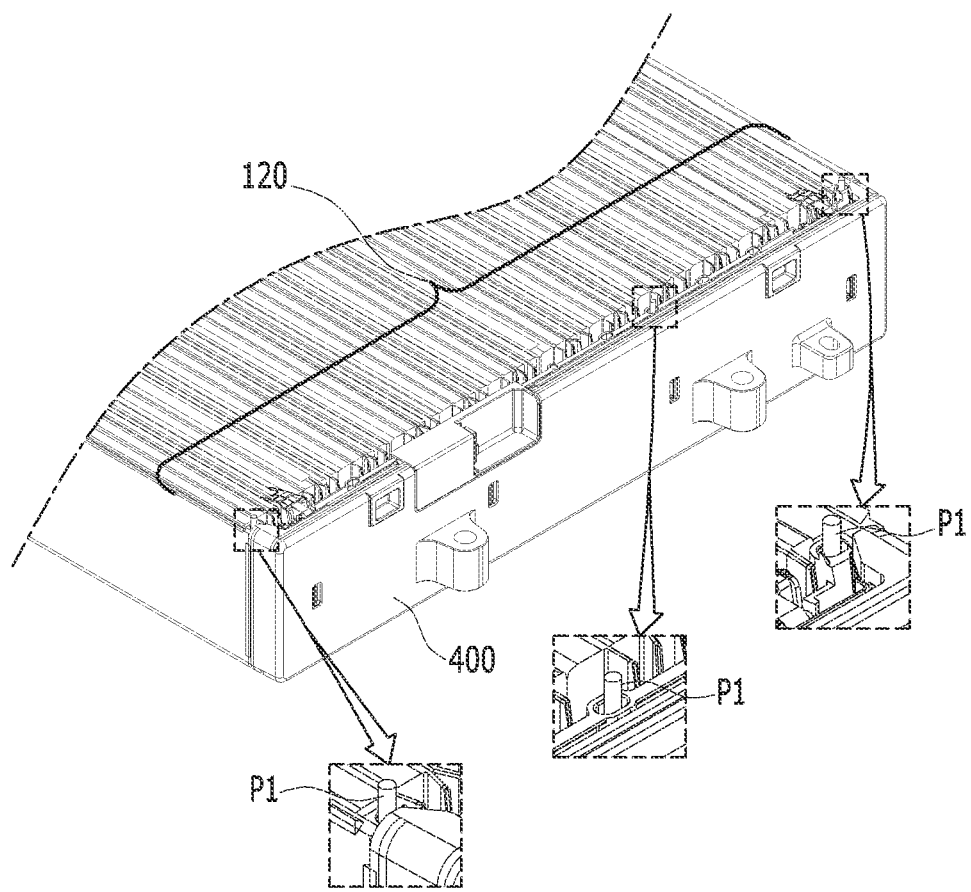
FIG. 5 illustrates a partial perspective view of a battery module from which an upper cover is removed.
Figure 6:
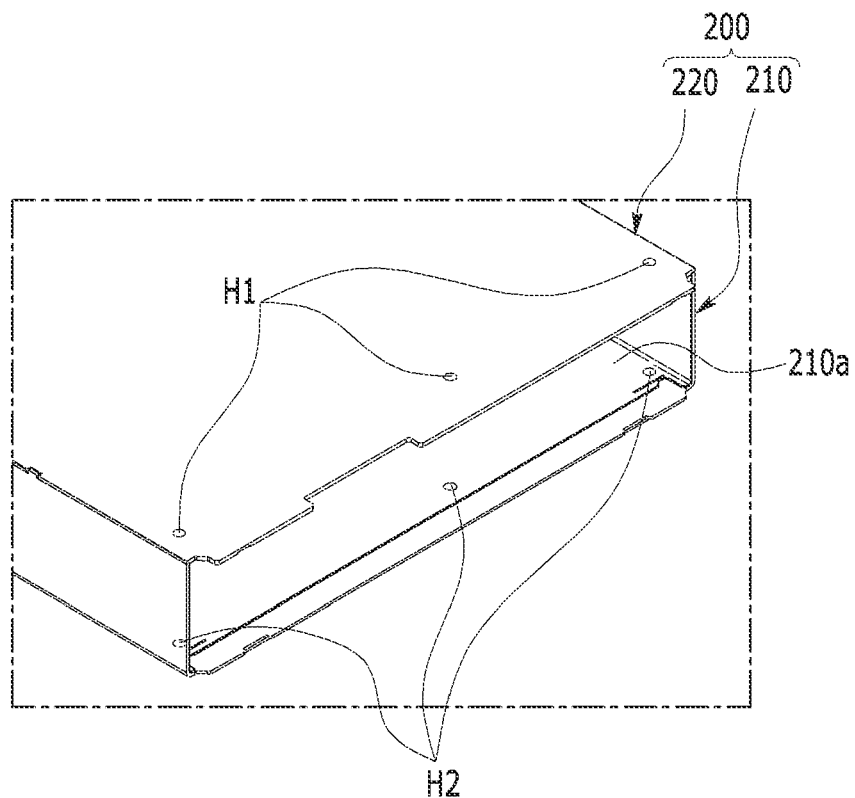
FIG. 6 illustrates a perspective view of a module frame included in the battery module of FIG. 2.
Figure 7:
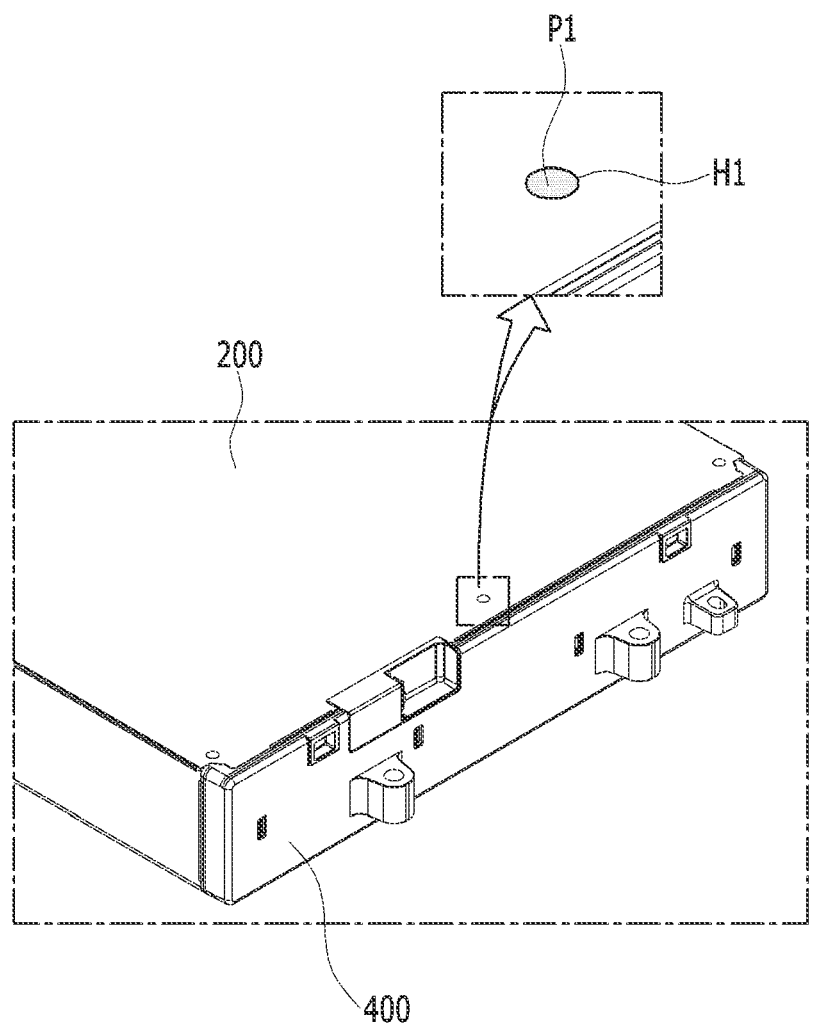
FIG. 7 illustrates a partial perspective view of a battery module to which an upper cover is coupled.

FIG. 4 illustrates a perspective view of a bus bar frame included in the battery module of FIG. 2. FIG. 5 illustrates a partial perspective view of a battery module from which an upper cover is removed. FIG. 6 illustrates a perspective view of a module frame included in the battery module of FIG. 2. FIG. 7 illustrates a partial perspective view of a battery module to which an upper cover is coupled.

As described above, a protrusion is formed in one of the bus bar frame 300 and the module frame 200, and an insertion hole into which the protrusion is inserted is formed in the other one. Referring to FIG. 4 and FIG. 5, protrusions P1 and P2 may be formed on the bus bar frame 300. The protrusions P1 and P2 may include a first protrusion P1 protruding upward from an upper edge of the bus bar frame 300 and a second protrusion P2 protruding downward from a lower edge of the bus bar frame 300.

Referring to FIG. 6, insertion holes H1 and H2 may be formed in the module frame 200. The insertion holes H1 and H2 may include a first insertion hole H1 formed in an upper plate of the module frame 200 and a second insertion hole H2 formed in a lower plate of the module frame 200. Herein, the upper plate of the module frame 200 may correspond to the upper cover 220, and the lower plate of the module frame 200 may correspond to the bottom portion 210a of the U-shaped frame 210. In other words, the first insertion hole H1 may be formed in the upper cover 220, and the second insertion hole H2 may be formed in the bottom portion 210a of the U-shaped frame 210. When the bus bar frame 300 and the module frame 200 are assembled, the first protrusion P1 may be inserted into the first insertion hole H1, and the second protrusion P2 may be inserted into the second insertion hole H2. FIG. 7 illustrates a state in which the first protrusion P1 is inserted into the first insertion hole H1 depending on assembly of the upper cover according to the present embodiment.

In the case of a large-area battery module in which the number of battery cells 110 included in the battery module 100 increases, since a size of the battery module 100 increases, there is a risk that the bus bar frame 300 may be bent. In particular, an increase in the number of battery cells 110 indicates that a length of the battery module 100 in the stacking direction (direction parallel to the x-axis) of the battery cells 110 is increased. The bus bar frame 300 has no choice but to increase a length thereof in the stacking direction of the battery cells 110, and thus the bus bar frame 300, which is an injection member, may be bent in the direction in which the battery cell stack 120 is positioned, i.e., in a direction parallel to the y-axis.

Accordingly, according to the present embodiment, the bus bar frame 300 and the module frame 200 include the protrusions P1 and P2 and the insertion holes H1 and H2, respectively, to prevent the bending of the bus bar frame 300. In particular, since the first protrusion P1 and the second protrusion P2 may protrude upward and downward from the bus bar frame 300, respectively, to prevent the bus bar frame 300 from being bent in the direction in which the battery cell stack 120 is positioned. Finally, the protrusions P1 and P2 and the insertion holes H1 and H2 may block the bus bar frame 300 from being bent, to prevent the pressure caused by the bending from damaging the bus bar 310 or the electrode leads 111 and 112 mounted on the bus bar frame 300.

In addition, when the bus bar frame 300 and the module frame 200 are assembled, it is possible to improve assembly and manufacturing processability between each component such as the bus bar frame 300 while the first protrusion P1 is inserted into the first insertion hole H1, and the second protrusion P2 is inserted into the second insertion hole H2. More specifically, when manufacturing the battery module 100, the battery cell stack 120 coupled to the bus bar frame 300 may be positioned on the bottom portion 210a of the U-shaped frame 210, and then the upper cover 220 may be positioned to cover an upper surface of the cell stack 120. Then, the upper cover 220 and the U-shaped frame 210 are coupled through welding or the like in a state in which their corresponding corner portions are in contact. Herein, when the battery cell stack 120 is positioned on the bottom portion 210a of the U-shaped frame 210, the downward second protrusion P2 is inserted into the second insertion hole H2, and thus it is possible to improve assembly and manufacturing processability between the battery cell stack 120 to which the bus bar frame 300 is coupled and the U-shaped frame 210. In addition, since the first protrusion P1 is inserted into the first insertion hole H1 when the upper cover 220 is positioned and is welded with the U-shaped frame 210, it is possible to improve assembly and manufacturing processability between the upper cover 220 and the U-shaped frame 210, and also to easily performing the welding.

In the meantime, according to the exemplary embodiment, it is preferable that the protrusions P1 and P2 and the insertion holes H1 and H2 are each configured in a plurality in order to effectively prevent bending and improve assembly. For example, it is preferable that the first protrusion P1 and the first insertion hole H1 each include at least three positioned at opposite ends and a center of an upper edge of the bus bar frame 300. Similarly, it is preferable that the second protrusion P2 and the second insertion hole H2 each include at least three positioned at opposite ends and a center of a lower edge of the bus bar frame 300.

Hereinafter, a protrusion and an insertion hole according to another embodiment of the present invention will be described in detail with reference to FIG. 8 to FIG. 9.

Figure 8:
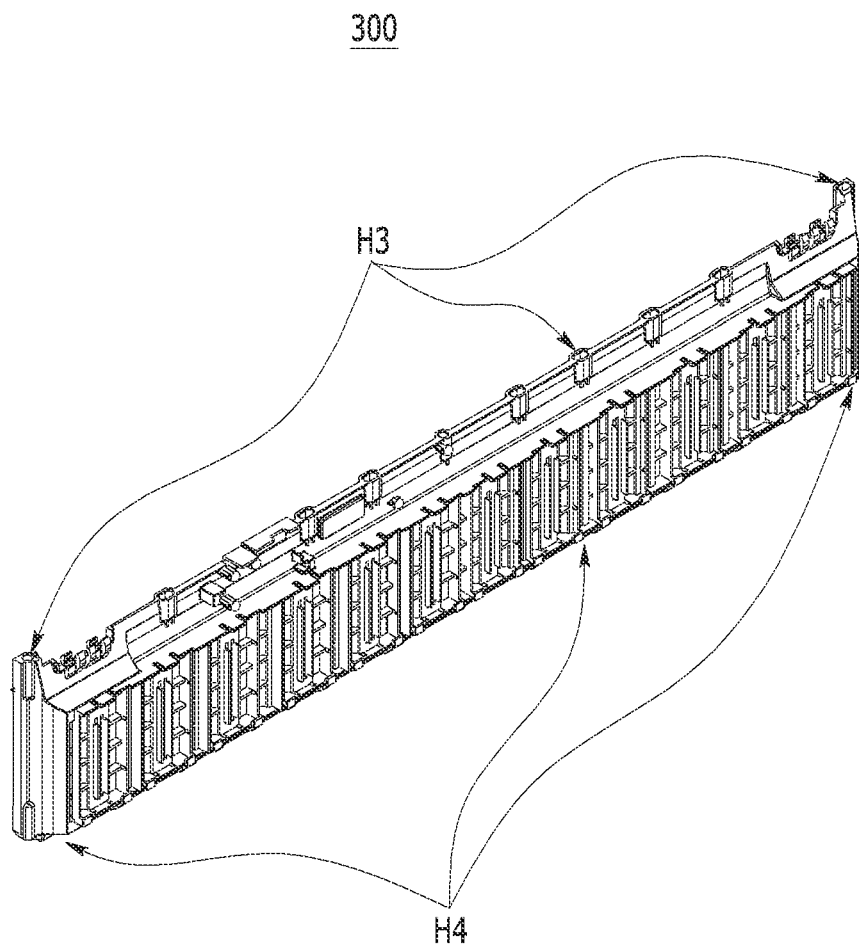
FIG. 8 illustrates a perspective view of a bus bar frame according to another embodiment of the present invention.
Figure 9:
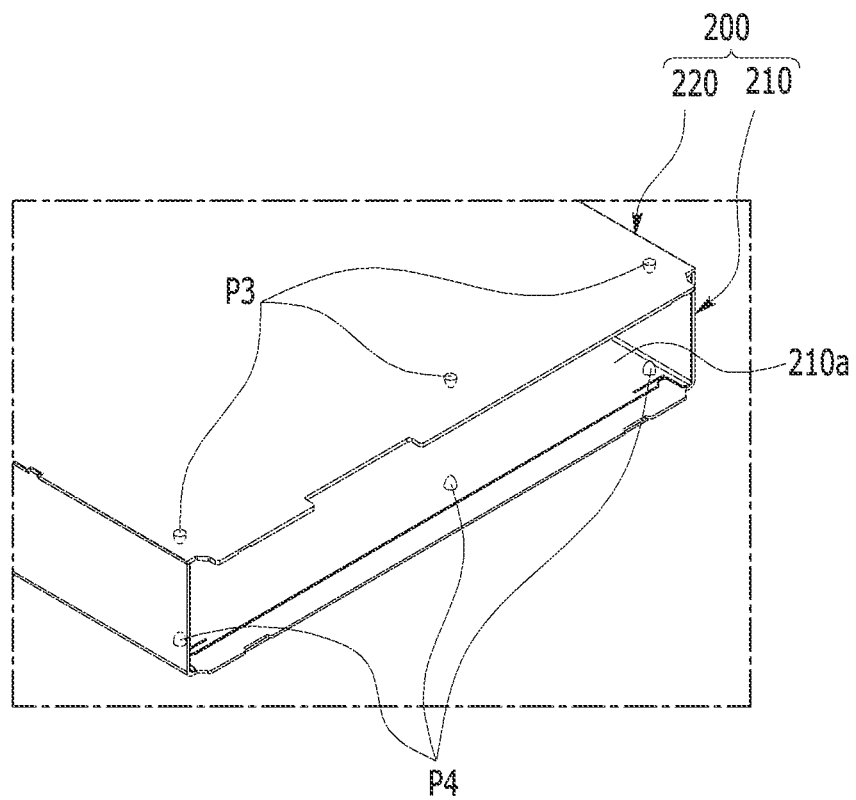
FIG. 9 illustrates a perspective view of a module frame according to another embodiment of the present invention.

FIG. 8 illustrates a perspective view of a bus bar frame according to another embodiment of the present invention, and FIG. 9 illustrates a perspective view of a module frame according to another embodiment of the present invention.

Referring to FIG. 8 and FIG. 9, insertion holes H3 and H4 may be formed in the bus bar frame 300 according to the present embodiment. The insertion holes H3 and H4 may include a third insertion hole H3 formed in an upper edge of the bus bar frame 300 and a fourth insertion hole H4 formed in a lower edge of the bus bar frame 300.

Protrusions P3 and P4 may be formed in the module frame 200. The protrusions P3 and P4 may include a third protrusion P3 protruding upward from an upper plate of the bus bar frame 200 and a fourth protrusion P4 protruding downward from a lower plate of the bus bar frame 200. Herein, the upper plate of the module frame 200 may correspond to the upper cover 220, and the lower plate of the module frame 200 may correspond to the bottom portion 210a of the U-shaped frame 210. In other words, the third protrusion P3 may be formed on the upper cover 220, and the fourth protrusion P4 may be formed on the bottom portion 210a of the U-shaped frame 210. Although there is no particular limitation on a method of forming the third protrusion P3 and the fourth protrusion P4, a depressed structure may be formed on an outer surface of the upper plate of the module frame 200 to form the downwardly protruding third protrusion P3, and a recessed structure may be formed on an outer surface of the lower plate of the module frame 200 to form the upwardly protruding fourth protrusion P4.

When the bus bar frame 300 and the module frame 200 are assembled, the third protrusion P3 may be inserted into the third insertion hole H3, and the fourth protrusion P4 may be inserted into the fourth insertion hole H4.

The third protrusion P3 and the fourth protrusion P4 protruding upward and downward may be respectively inserted into the third insertion hole H3 and the fourth insertion hole H4 so that the bus bar frame is bent in the direction in which the battery cell stack is positioned. In addition, it is possible to improve assembly and manufacturing processability between each component including the bus bar frame 300.

In addition, it is preferable that the protrusions P3 and P4 and the insertion holes H3 and H4 are each configured in a plurality in order to effectively prevent bending and improve assembly. For example, it is preferable that the third protrusion P3 and the third insertion hole H3 each include at least three positioned at opposite ends and a center of an upper edge of the bus bar frame 300. Similarly, it is preferable that the fourth protrusion P4 and the fourth insertion hole H4 each include at least three positioned at opposite ends and the center of the lower edge of the bus bar frame 300.

In the present embodiment, terms indicating directions such as front, back, left, right, up, and down are used, but these terms are for convenience of description only, and may vary depending on a position of an object or a position of an observer.

One or more battery modules according to the present embodiment described above may be mounted together with various control and protection systems such as a battery management system (BMS) and a cooling system to constitute a battery pack.

The battery module or battery pack may be applied to various devices. Specifically, it may be applied to a transportation apparatus such as an electric bicycle, an electric vehicle, a hybrid vehicle, and the like, but is not limited thereto, and may be applied to various devices that can use rechargeable batteries.

While this invention has been described in connection with what is presently considered to be practical embodiments, it is to be understood that the invention is not limited to the disclosed embodiments, but, on the contrary, is intended to cover various modifications and equivalent arrangements included within the spirit and scope greater than or equal to appended claims.

DESCRIPTION OF SYMBOLS

100: battery module
300: bus bar frame

200: module frame
210: U-shaped frame
220: upper cover
P1, P2, P3, P4: protrusion
H1, H2, H3, H4: insertion hole

The invention claimed is:

1. A battery module comprising:
a battery cell stack configured to include a plurality of battery cells, the battery cells including electrode leads that are stacked in the battery cells;
a module frame configured to accommodate the battery cell stack; and
a bus bar frame positioned in a protrusion direction that the electrode leads protrude from the battery cells,
wherein a first protrusion is formed in either the bus bar frame or the module frame,
wherein a first insertion hole into which the first protrusion is inserted is formed in the other of the bus bar frame and the module frame than the one of the bus bar frame and the module frame in which the protrusion is formed, and
wherein the first protrusion is formed on the module frame, and the first insertion hole is formed in the bus bar frame.

2. The battery module of claim 1, wherein
the first protrusion is one of a plurality of module frame protrusions formed on the module frame,
the plurality of module frame protrusions includes a module frame upper plate protrusion protruding downward from an upper plate of the module frame; and
a module frame lower plate protrusion protruding upward from a lower plate of the module frame.

3. The battery module of claim 2, wherein
the first insertion hole is one of a plurality of bus bar frame insertion holes formed in the bus bar frame,
the plurality of bus bar frame insertion holes includes a bus bar frame upper edge insertion hole formed in an upper edge of the bus bar frame, and
a bus bar frame lower edge insertion hole formed in a lower edge of the bus bar frame,
the module frame upper plate protrusion is inserted into the bus bar frame upper edge insertion hole, and
the module frame lower plate protrusion is inserted into the module frame lower edge insertion hole.

4. The battery module of claim 1, wherein
the bus bar frame is an injection member manufactured by injection molding.

5. The battery module of claim 1, wherein
the first protrusion is one of a plurality of protrusions and the first insertion hole is one of a plurality of insertion holes.

6. The battery module of claim 1, wherein
the module frame includes a U-shaped frame that covers a lower surface and opposing side surfaces of the battery cell stack and an upper cover that covers an upper surface of the battery cell stack.

7. A battery pack comprising the battery module according to claim 1.

8. The battery module of claim 1, wherein the plurality of battery cells of the battery cell stack includes 32 to 48 of the battery cells.

* * * * *